United States Patent
Shibuya

(10) Patent No.: US 10,720,647 B2
(45) Date of Patent: Jul. 21, 2020

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON- AQUEOUS SECONDARY BATTERY

(71) Applicant: ZEON CORPORATION, Chiyoda-ku, Tokyo (JP)

(72) Inventor: Masanori Shibuya, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 145 days.

(21) Appl. No.: 16/070,010

(22) PCT Filed: Jan. 23, 2017

(86) PCT No.: PCT/JP2017/002146
§ 371 (c)(1),
(2) Date: Jul. 13, 2018

(87) PCT Pub. No.: WO2017/130910
PCT Pub. Date: Aug. 3, 2017

(65) Prior Publication Data
US 2019/0013523 A1    Jan. 10, 2019

(30) Foreign Application Priority Data
Jan. 29, 2016   (JP) ................. 2016-016301

(51) Int. Cl.
| | |
|---|---|
| *H01M 4/62* | (2006.01) |
| *C08K 5/32* | (2006.01) |
| *C08L 33/26* | (2006.01) |
| *C08F 20/56* | (2006.01) |
| *H01M 10/0566* | (2010.01) |
| *C08F 220/06* | (2006.01) |
| *C08F 220/56* | (2006.01) |
| *H01M 4/13* | (2010.01) |
| *H01M 10/0525* | (2010.01) |
| *C08K 5/17* | (2006.01) |

(52) U.S. Cl.
CPC ............ *H01M 4/622* (2013.01); *C08F 20/56* (2013.01); *C08F 220/06* (2013.01); *C08F 220/56* (2013.01); *C08K 5/32* (2013.01); *C08L 33/26* (2013.01); *H01M 4/13* (2013.01); *H01M 4/62* (2013.01); *H01M 10/0525* (2013.01); *H01M 10/0566* (2013.01); *C08F 2800/20* (2013.01); *C08K 5/17* (2013.01)

(58) Field of Classification Search
CPC .......... H01M 4/622; H01M 4/13; H01M 4/62; H01M 10/0525; H01M 10/0566; C08F 20/56; C08F 220/06
USPC .......................................... 429/217
See application file for complete search history.

(56) References Cited

U.S. PATENT DOCUMENTS

| | | | | |
|---|---|---|---|---|
| 8,124,277 | B2* | 2/2012 | Anada ................. | C09J 123/147 361/502 |
| 9,273,399 | B2* | 3/2016 | Hellring ................. | C23C 22/34 |
| 9,431,659 | B2* | 8/2016 | Kim ....................... | H01M 4/622 |
| 2012/0107690 | A1* | 5/2012 | Wakizaka ............. | H01M 4/621 429/217 |
| 2013/0323592 | A1* | 12/2013 | Lee ....................... | H01M 4/622 429/217 |
| 2013/0330622 | A1 | 12/2013 | Sasaki et al. | |
| 2015/0263350 | A1 | 9/2015 | Kang et al. | |
| 2017/0062828 | A1 | 3/2017 | Sonobe et al. | |
| 2018/0083309 | A1* | 3/2018 | Ho ......................... | H01M 4/661 |
| 2018/0316051 | A1* | 11/2018 | Lee ....................... | H01M 2/1646 |

FOREIGN PATENT DOCUMENTS

| | | | | |
|---|---|---|---|---|
| JP | 2003331848 | A | 11/2003 | |
| JP | 2013045714 | A | 3/2013 | |
| JP | 2013122913 | A | 6/2013 | |
| JP | 2013145763 | A | 7/2013 | |
| JP | 2014130702 | A | 7/2014 | |
| JP | 2014203555 | A | 10/2014 | |
| JP | 2015022956 | A * | 2/2015 | |
| JP | 2015106489 | A | 6/2015 | |
| WO | WO-2012026462 | A1 * | 3/2012 | ........ H01M 10/0525 |
| WO | 2012115096 | A1 | 8/2012 | |
| WO | 2015008626 | A1 | 1/2015 | |
| WO | WO-2015146649 | A1 * | 10/2015 | ............ H01M 4/139 |
| WO | 2015186363 | A1 | 12/2015 | |

OTHER PUBLICATIONS

Machine translation of JP 2015-022956 (no date).*
Machine translation of WO 2012/026462 (no date).*
Machine translation of WO 2015/146649 (no date).*
Jul. 31, 2018, International Preliminary Report on Patentability issued in the International Patent Application No. PCT/JP2017/002146.
Aug. 26, 2019, the Extended European Search Report issued by the European Patent Office in the corresponding European Patent Application No. 17744140.9.
Apr. 4, 2017, International Search Report issued in the International Patent Application No. PCT/JP2017/002146.

* cited by examiner

*Primary Examiner* — Amanda C. Walke
(74) *Attorney, Agent, or Firm* — Kenja IP Law PC

(57) ABSTRACT

A binder composition for a non-aqueous secondary battery electrode contains a water-soluble polymer including a (meth)acrylamide monomer unit and an amine compound. Percentage content M0 of the (meth)acrylamide monomer unit is at least 40 mass % and not more than 100 mass % relative to 100 mass % of all monomer units of the water-soluble polymer. Content M1 of the amine compound is at least 0.01 parts by mass and not more than 0.5 parts by mass per 100 parts by mass of solid content of the water-soluble polymer.

7 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON- AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode for a secondary battery, such as a lithium ion secondary battery, normally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium, and drying the applied slurry composition.

In order to further improve the performance of secondary batteries, attempts have been made in recent years to further improve binder compositions used in electrode mixed material layer formation.

For example, PTL 1 discloses a technique for producing an aqueous electrode binder by adding N-methyl-benzisothiazolin-3-one as a preservative to a water-soluble polymer used as a binder having a methacrylic acid monomer unit as a main component in a solid content ratio of 100/10 (water-soluble polymer/N-methyl-benzisothiazolin-3-one). In the aqueous electrode binder of PTL 1 and an aqueous electrode composition produced using the aqueous electrode binder, the water-soluble polymer itself displays dispersing ability and viscosity modification functionality, and a produced secondary battery has improved capacity maintenance rate and the like.

On the other hand, a water-soluble polymer including a repeating unit derived from (meth)acrylamide, for example, has been proposed (PTL 2) as a water-soluble polymer for use in production of a secondary battery from a viewpoint of providing a binder composition for a power storage device that enables production of a power storage device having excellent electrode close adherence and charge/discharge characteristics. It has been confirmed with respect to the binder composition for a power storage device of PTL 2 that sedimentation does not occur even after one month of refrigerated storage.

CITATION LIST

Patent Literature

PTL 1: JP 2014-130702 A
PTL 2: WO 2015/008626 A1

SUMMARY

Technical Problem

However, in a production process of an actual secondary battery, it is desirable for a water-soluble polymer including a (meth)acrylamide monomer unit to be stably stored at a temperature around normal temperature over a reasonably long period from a viewpoint of ease of production. In relation to the above, the inventor focused on a problem that a change in partially crosslinked state occurs over time in the case of a (meth)acrylamide polymer including a (meth)acrylamide monomer unit, and thus the viscosity of a water-soluble polymer including a (meth)acrylamide monomer unit also changes over time. The inventor thought that this change in viscosity over time may lead to loss of secondary battery performance by, for example, acting as a cause of deterioration of close adherence between an electrode mixed material layer and a current collector in a produced electrode, deterioration of battery characteristics such as cycle characteristics of a produced secondary battery, change in battery shape after charge/discharge cycling, and so forth. Accordingly, it was necessary to inhibit change in partial crosslinking of a (meth)acrylamide polymer over time and inhibit change in viscosity of a water-soluble polymer including a (meth)acrylamide monomer unit over time even in a situation in which a (meth)acrylamide monomer unit is used in production of a battery member, such as an electrode, and a secondary battery.

In the present specification, "(meth)acryl" is used to indicate "acryl" or "methacryl".

In light of the point set forth above, in relation to a conventional technique that provide an aqueous composition for a secondary battery containing a polymer that includes a (meth)acrylamide monomer unit, there was scope for investigating viscosity stability of the aqueous composition for a secondary battery after passing of a certain period.

Moreover, in order to further improve secondary battery performance, it was necessary to achieve battery characteristics such as electrode close adherence, secondary battery cycle characteristics, safety in terms of not experiencing battery swelling or the like even upon repeated charge/discharge cycling, long service life, and so forth.

Therefore, an objective of the present disclosure is to provide a binder composition that even when a water-soluble polymer including a (meth)acrylamide monomer unit is used, can inhibit change in viscosity of the water-soluble polymer over time.

Another objective of this disclosure is to provide a binder composition that enables production of an electrode having excellent close adherence and a secondary battery that has excellent cycle characteristics and can inhibit change in battery shape even upon repeated charge/discharge cycling.

Solution to Problem

The inventor conducted a diligent investigation with the aim of solving the problems set forth above. Through this investigation, the inventor discovered that by adjusting a (meth)acrylamide monomer unit included in a water-soluble polymer and an amine compound to specific contents in production of a binder composition, change in viscosity of the water-soluble polymer in the binder composition over time can be inhibited. Moreover, the inventor confirmed that when the binder composition containing the water-soluble polymer for which viscosity change is inhibited is used, close adherence between an electrode mixed material layer and a current collector in a produced electrode is excellent, and a produced secondary battery has excellent cycle characteristics and can be safely used with a long service life and without swelling of battery shape or the like even after repeated charge/discharge cycling. In this manner, the inventor completed the present disclosure.

Specifically, the present disclosure aims to advantageously solve the problems set forth above by disclosing a binder composition for a non-aqueous secondary battery electrode comprising: a water-soluble polymer including a (meth)acrylamide monomer unit; and an amine compound, wherein percentage content M0 of the (meth)acrylamide monomer unit is at least 40 mass % and not more than 100 mass % relative to 100 mass % of all monomer units of the water-soluble polymer, and content M1 of the amine compound is at least 0.01 parts by mass and not more than 0.5 parts by mass per 100 parts by mass of solid content of the water-soluble polymer. Through combined use of a water-soluble polymer including a (meth)acrylamide monomer unit with a specific percentage content and an amine compound with a specific content, change in viscosity of the water-soluble polymer over time can be inhibited even though the water-soluble polymer includes a (meth)acrylamide monomer unit. Moreover, an electrode produced using this water-soluble polymer-containing binder composition has high close adherence, a secondary battery produced using this water-soluble polymer containing binder composition has excellent cycle characteristics, and electrode swelling after repeated cycling can be inhibited.

In the present disclosure, the term "water-soluble polymer" refers to a polymer that when 0.5 g of the polymer is dissolved in 100 g of water at a temperature of 25° C., insoluble content is less than 1.0 mass %.

In the presently disclosed binder composition for a non-aqueous secondary battery electrode, a mass ratio M=M1/M0 calculated from the content M1 of the amine compound and the percentage content M0 of the (meth)acrylamide monomer unit is preferably at least $0.10 \times 10^{-3}$ and not more than $12.5 \times 10^{-3}$. This is preferable because change in viscosity of the water-soluble polymer over time can be further inhibited when the mass ratio in which the amine compound and the (meth)acrylamide monomer unit of the water-soluble polymer are contained in the binder composition is within the range set forth above. Moreover, cycle characteristics of a secondary battery produced using the water-soluble polymer can be further improved.

In the presently disclosed binder composition for a non-aqueous secondary battery electrode, the amine compound preferably has a nitric oxide radical generating structure. This is preferable because change in viscosity of the water-soluble polymer can be further inhibited even over time when the amine compound contained in the water-soluble polymer generates nitric oxide radicals. Moreover, close adherence of an electrode produced using the water-soluble polymer can be further improved, cycle characteristics of a secondary battery produced using the water-soluble polymer can be further improved, and electrode swelling after repeated cycling can be further inhibited.

In the presently disclosed binder composition for a non-aqueous secondary battery electrode, the amine compound is preferably hydroxylamine sulfate or diethylhydroxylamine. This is because change in viscosity of the water-soluble polymer can be further inhibited even over time when the amine compound is hydroxylamine sulfate or diethylhydroxylamine. Moreover, close adherence of an electrode produced using the water-soluble polymer can be further improved, and cycle characteristics of a secondary battery produced using the water-soluble polymer can be further improved.

In the presently disclosed binder composition for a non-aqueous secondary battery electrode, the water-soluble polymer preferably has a weight average molecular weight of at least $0.01 \times 10^{6}$ and not more than $20.0 \times 10^{6}$. This is because close adherence of an electrode produced using the water-soluble polymer can be further improved when the weight average molecular weight of the water-soluble polymer is within the range set forth above. Moreover, cycle characteristics of a secondary battery produced using the water-soluble polymer can be further improved and electrode swelling after repeated cycling can be further inhibited.

In the present disclosure, the term "weight average molecular weight" refers to weight average molecular weight calculated in terms of monodisperse pullulan used as a reference substance by gel permeation chromatography according to a method described in the subsequent EXAMPLES section.

Moreover, the present disclosure aims to advantageously solve the problems set forth above by disclosing a slurry composition for a non-aqueous secondary battery electrode comprising: an electrode active material; and any one of the binder compositions for a non-aqueous secondary battery electrode set forth above. When a slurry composition contains the binder composition set forth above in this manner, good close adherence can be achieved between an electrode mixed material layer and a current collector in an electrode produced using the slurry composition. Moreover, a secondary battery produced using the slurry composition can be caused to display good cycle characteristics. Furthermore, battery shape of the produced battery can be maintained without electrode swelling or the like even upon repeated charging and discharging, which enables safe long-term use of the secondary battery.

Moreover, the present disclosure aims to advantageously solve the problems set forth above by disclosing an electrode for a non-aqueous secondary battery produced using the slurry composition for a non-aqueous secondary battery electrode set forth above. By producing an electrode using a slurry composition containing a water-soluble polymer including a (meth)acrylamide monomer unit with a specific percentage content and an amine compound with a specific content in this manner, good close adherence is achieved between an electrode mixed material layer and a current collector of the electrode. Moreover, a secondary battery including the electrode has better cycle characteristics, change in shape such as electrode swelling after repeated cycling of the produced secondary battery can be inhibited, and the secondary battery can be caused to favorably display long service life and safety.

Furthermore, the present disclosure aims to advantageously solve the problems set forth above by disclosing a non-aqueous secondary battery comprising a positive electrode, a negative electrode, a separator, and an electrolysis solution, wherein the positive electrode or the negative electrode is the electrode for a non-aqueous secondary battery set forth above. The produced secondary battery can be caused to display good cycle characteristics when the positive electrode or the negative electrode is the presently disclosed electrode in this manner. Furthermore, battery shape can be maintained without electrode swelling or the like even upon repeated charging and discharging of the produced secondary battery, which enables safe long-term use of the secondary battery.

Advantageous Effect

According to the present disclosure, it is possible to provide a binder composition that even when a water-soluble polymer including a (meth)acrylamide monomer unit is used, can inhibit change in viscosity of a water-soluble polymer including a (meth)acrylamide polymer over time.

Moreover, according to the present disclosure, it is possible to provide a binder composition that enables production of an electrode having excellent close adherence and a secondary battery that has excellent cycle characteristics and can inhibit change in battery shape even upon repeated charge/discharge cycling.

DETAILED DESCRIPTION

The following provides a detailed description of an embodiment of the present disclosure.

Herein, a presently disclosed binder composition for a non-aqueous secondary battery electrode can be used in production of a slurry composition for an electrode of a non-aqueous secondary battery such as a lithium ion secondary battery. Moreover, the slurry composition for an electrode of a non-aqueous secondary battery produced using the presently disclosed binder composition for a non-aqueous secondary battery electrode can be used in production of an electrode included in a non-aqueous secondary battery.

(Binder Composition for Non-Aqueous Secondary Battery Electrode)

A feature of the presently disclosed binder composition for a non-aqueous secondary battery electrode is the inclusion of a water-soluble polymer including a (meth)acrylamide monomer unit in a specific amount and a specific amount of an amine compound. As a result of the presently disclosed binder composition for a non-aqueous secondary battery electrode having the specific composition described above, even when the binder composition is, for example, stored at normal temperature over a certain period, change in (meth)acrylamide polymer viscosity over time can be inhibited. In other words, the presently disclosed binder composition for a non-aqueous secondary battery electrode has excellent storage stability.

<Water-Soluble Polymer>

A feature of the water-soluble polymer used in the present disclosure is the inclusion of a (meth)acrylamide monomer unit in a specific proportion. In addition to the (meth)acrylamide monomer unit, the water-soluble polymer may further include monomer units other than the (meth)acrylamide monomer unit.

<<(Meth)acrylamide Monomer Unit>>
[Percentage content M0]

The water-soluble polymer contained in the presently disclosed binder composition for a non-aqueous secondary battery electrode is required to include a (meth)acrylamide monomer unit in a proportion of at least 40 mass % and not more than 100 mass % relative to 100 mass % of all monomer units of the water-soluble polymer. In other words, the water-soluble polymer may be composed of only (meth) acrylamide monomer units. The percentage content of the (meth)acrylamide monomer unit is preferably 50 mass % or more, more preferably 60 mass % or more, and even more preferably 70 mass % or more, and is preferably 90 mass % or less, and more preferably 80 mass % or less. As a result of the percentage content of the (meth)acrylamide monomer unit being 40 mass % or more, in a situation in which the binder composition containing this (meth)acrylamide monomer unit-containing water-soluble polymer is used in production of a slurry composition for an electrode, dispersibility of an electrode active material in the slurry composition increases, and a slurry composition can be produced in which formation of sediment over time tends not to occur and that has excellent storage stability. Moreover, as a result of this excellent dispersibility contributing to enable favorable coating of the electrode active material surface by polymer component, a produced secondary battery can be caused to display excellent cycle characteristics, and change in electrode shape can be inhibited even after repeated cycling. Moreover, change in viscosity of the (meth)acrylamide monomer unit-containing water-soluble polymer over time can be favorably inhibited when the percentage content of the (meth)acrylamide monomer unit is not more than any of the upper limits set forth above.

[Type]

Examples of (meth)acrylamide monomers that can form a (meth)acrylamide monomer unit include, but are not specifically limited to, acrylamide, methacrylamide, N-methylolacrylamide, N-methylolmethacrylamide, hydroxyethyl acrylamide, hydroxyethyl methacrylamide, 2-acrylamido-2-methylpropane sulfonic acid, 2-methacrylamido-2-methylpropane sulfonic acid, N-isopropylacrylamide, N,N-dimethylacrylamide, N,N-dimethylmethacrylamide, N,N-diethylacrylamide, N,N-diethylmethacrylamide, N,N-dimethylaminopropylacrylamide, N,N-dimethylaminopropyl methacrylamide, diacetone acrylamide, and maleic acid amide. Of these (meth)acrylamide monomers, acrylamide, methacrylamide, and hydroxyethyl acrylamide are preferable, and acrylamide is more preferable from a viewpoint of ensuring good dispersibility, viscosity, and so forth in the binder composition and slurry composition. One of these (meth)acrylamide monomers may be used individually, or two or more of these (meth)acrylamide monomers may be used in combination in a freely selected ratio.

<<Other Monomer Units>>

No specific limitations are placed on monomer units other than the (meth)acrylamide monomer unit that may optionally be included in the water-soluble polymer other than being monomer units that can be used with the (meth) acrylamide monomer unit. Examples of such other monomer units include an ethylenically unsaturated carboxylic acid monomer unit, a (meth)acrylic acid ester monomer unit, a vinyl cyanide monomer unit, a hydroxyalkyl group-containing unsaturated monomer unit, a di(meth)acrylic acid ester monomer unit, an aromatic vinyl monomer unit, and an aliphatic conjugated diene monomer unit. Of these other monomer units, an ethylenically unsaturated carboxylic acid monomer unit is preferable. One type of other monomer unit may be used individually, or two or more types of other monomer units may be used in combination in a freely selected ratio.

Examples of ethylenically unsaturated carboxylic acid monomers that can form an ethylenically unsaturated carboxylic acid monomer unit include mono and dicarboxylic acids (acid anhydrides) such as acrylic acid, methacrylic acid, crotonic acid, maleic acid, fumaric acid, and itaconic acid. Of these ethylenically unsaturated carboxylic acid monomers, acrylic acid is preferable. One ethylenically unsaturated carboxylic acid monomer may be used individually, or two or more ethylenically unsaturated carboxylic acid monomers may be used in combination in a freely selected ratio.

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, butyl acrylate (for example, n-butyl acrylate and t-butyl acrylate), pentyl acrylate, hexyl acrylate, heptyl acrylate, octyl acrylate (for example, 2-ethylhexyl acrylate), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (for example, n-butyl methacrylate and t-butyl methacrylate), pentyl methacrylate, hexyl methacrylate, heptyl methacrylate, octyl methacrylate (for example, 2-ethylhexyl methacrylate), nonyl methacrylate, decyl methacrylate, lauryl methacrylate, n-tetradecyl methacrylate, and stearyl methacrylate. One (meth)acrylic acid ester monomer may be used individually, or two or more (meth)acrylic acid ester monomers may be used in combination in a freely selected ratio.

Examples of vinyl cyanide monomers that can form a vinyl cyanide monomer unit include acrylonitrile, methacrylonitrile, α-chloroacrylonitrile, and α-ethylacrylonitrile. One of these vinyl cyanide monomers may be used individually, or two or more of these vinyl cyanide monomers may be used in combination in a freely selected ratio.

Examples of hydroxyalkyl group-containing unsaturated monomers that can form a hydroxyalkyl group-containing unsaturated monomer unit include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethyl methyl fumarate. One of these hydroxyalkyl group-containing unsaturated monomers may be used individually, or two or more of these hydroxyalkyl group-containing unsaturated monomers may be used in combination in a freely selected ratio.

Examples of di(meth)acrylic acid ester monomers that can form a di(meth)acrylic acid ester monomer unit include ethylene dimethacrylate, diethylene glycol dimethacrylate, ethylene glycol dimethacrylate, diethylene glycol diacrylate, and 1,3-butylene glycol diacrylate. One of these di(meth)acrylic acid ester monomers may be used individually, or two or more of these di(meth)acrylic acid ester monomers may be used in combination in a freely selected ratio.

Examples of aromatic vinyl monomers that can form an aromatic vinyl monomer unit include, but are not specifically limited to, styrene, α-methylstyrene, vinyltoluene, and divinylbenzene. One aromatic vinyl monomer may be used individually, or two or more aromatic vinyl monomers may be used in combination in a freely selected ratio.

Examples of aliphatic conjugated diene monomers that can form an aliphatic conjugated diene monomer unit include, but are not specifically limited to, 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes. One aliphatic conjugated diene monomer may be used individually, or two or more aliphatic conjugated diene monomers may be used in combination in a freely selected ratio.

<<Amine Compound>>
[Content M1]

The presently disclosed binder composition for a non-aqueous secondary battery electrode is required to contain at least 0.01 parts by mass and not more than 0.5 parts by mass of an amine compound per 100 parts by mass of solid content of the water-soluble polymer. The content of the amine compound is preferably 0.03 parts by mass or more, and more preferably 0.07 parts by mass or more, and is preferably 0.4 parts by mass or less, more preferably 0.3 parts by mass or less, and even more preferably 0.15 parts by mass or less. When the content of the amine compound is 0.01 parts by mass or more, the amine compound reacts with a moiety in the (meth)acrylamide monomer unit included in the water-soluble polymer that is susceptible to partial crosslinking over time such that the progress of crosslinking is inhibited. Consequently, change in viscosity of the water-soluble polymer, and particularly reduction in viscosity, is inhibited even upon storage of the water-soluble polymer for a certain period (for example, leaving the water-soluble polymer at a normal temperature of approximately 20° C.±10° C.), and the water-soluble polymer can be caused to display excellent storage stability. In addition, an electrode produced using the water-soluble polymer can be provided with good close adherence, a secondary battery produced using the water-soluble polymer can be provided with good cycle characteristics, and change in electrode shape after repeated cycling can be inhibited. In other words, a secondary battery having excellent life characteristics and the like can be provided. Moreover, when the content of the amine compound is 0.5 parts by mass or less, decomposition of electrolysis solution by the amine compound inside a produced secondary battery can be prevented, and the secondary battery can be caused to display good cycle characteristics.

[Mass ratio $M=M1/M0$]

A mass ratio $M=M1/M0$ calculated from the percentage content M0 of the (meth)acrylamide monomer unit and the content M1 of the amine compound described above is preferably $0.10\times10^{-3}$ or more, more preferably $0.50\times10^{-3}$ or more, and even more preferably $1.00\times10^{-3}$ or more, and is preferably $12.5\times10^{-3}$ or less, more preferably $3.00\times10^{-3}$ or less, and even more preferably $2.00\times10^{-3}$ or less. When the mass ratio of the (meth)acrylamide monomer unit and the amine compound is at least any of the lower limits set forth above, the amine compound reacts with a moiety in the (meth)acrylamide monomer unit that is susceptible to partial crosslinking over time such that the progress of crosslinking can be further inhibited. Consequently, change in viscosity of the water-soluble polymer, and particularly reduction in viscosity, can be inhibited even upon storage of the water-soluble polymer for a certain period, and the water-soluble polymer can be caused to display even better storage stability. In addition, an electrode produced using the water-soluble polymer can be provided with better close adherence, a secondary battery produced using the water-soluble polymer can be provided with better cycle characteristics, and change in electrode shape after repeated cycling can be further inhibited. Moreover, when the mass ratio of the (meth)acrylamide monomer unit and the amine compound is not more than any of the upper limits set forth above, decomposition of electrolysis solution by the amine compound inside a produced secondary battery can be prevented, and the secondary battery can be caused to display even better cycle characteristics.

Note that even within any of the ranges for the M value set forth above, it is normally preferable that the content M1 of the amine compound is increased in accompaniment to an increase in the percentage content M0 of the (meth)acrylamide monomer unit in consideration that the amine compound acts on the (meth)acrylamide monomer unit included in the water-soluble polymer.

Also note that in calculation of the M value, the mass of "100 mass % of all monomer units of the water-soluble polymer" and the mass of "100 parts by mass of solid content of the water-soluble polymer" are taken to be the same mass.

[Structure]

The amine compound preferably has a nitric oxide radical generating structure. Although the reason is not clear, the inclusion of a nitric oxide radical generating structure in the amine compound may, for example, further inhibit the progress of partial crosslinking of the (meth)acrylamide monomer unit over time through reaction of nitric oxide radicals generated in the water-soluble polymer during storage. Consequently, change in viscosity of the water-soluble polymer can be inhibited even when the water-soluble polymer is stored for a certain period, and the water-soluble polymer can be caused to display even better storage stability. The amine compound having a nitric oxide radical generating structure is preferably an amine compound having a hydroxylamino group (>NOH), and more preferably an amine compound having a hydroxylamino group and not having a branched chain in molecules thereof.

[Type]

Examples of amine compounds that may be used include, but are not specifically limited to, hydroxylamine sulfate, diethylhydroxylamine, dimethylhydroxylamine, dipropylhydroxylamine, isopropylhydroxylamine, and isothiazoline compounds. Of these amine compounds, hydroxylamine sulfate and diethylhydroxylamine are preferable from a viewpoint of favorably maintaining viscosity of the water-soluble polymer including the (meth)acrylamide monomer unit. One of these amine compounds may be used individually, or two or more of these amine compounds may be used in combination in a freely selected ratio.

<<Solvent>>

Herein, water such as deionized water, for example, may be used as a solvent to produce an aqueous solution containing the water-soluble polymer. Note that the solvent of the aqueous solution may be water or may be a mixed solution of water and a small amount of an organic solvent.

<<Production Method of Water-Soluble Polymer>>

The method of polymerization of the polymer constituting the water-soluble polymer may be any of solution polymerization, suspension polymerization, bulk polymerization, emulsion polymerization, and the like without any specific limitations. Moreover, the polymerization reaction may be addition polymerization such as ionic polymerization, radical polymerization, or living radical polymerization. The polymerization may be carried out with a commonly used polymerization initiator, polymerization accelerator, emulsifier, dispersant, chain transfer agent, or the like, and the amount thereof may also be the same as commonly used.

Examples of polymerization initiators that may be used in production of the water-soluble polymer include, but are not specifically limited to, known polymerization initiators such as sodium persulfate, ammonium persulfate, and potassium persulfate. Of these polymerization initiators, potassium persulfate is preferable. One of these polymerization initiators may be used individually, or two or more of these polymerization initiators may be used in combination in a freely selected ratio.

Examples of polymerization accelerators that may be used include, but are not specifically limited to, known reducing polymerization accelerators such as tetramethylethylenediamine.

Examples of emulsifiers that may be used include, but are not specifically limited to, known emulsifiers such as anionic surfactants, nonionic surfactants, cationic surfactants, and amphoteric surfactants. Specific examples of anionic surfactants include sulfuric acid ester salts of higher alcohols such as sodium dodecyl sulfate (i.e., sodium lauryl sulfate), ammonium dodecyl sulfate (i.e., ammonium lauryl sulfate), sodium octyl sulfate, sodium decyl sulfate, sodium tetradecyl sulfate, sodium hexadecyl sulfate, and sodium octadecyl sulfate; alkylbenzene sulfonic acid salts such as sodium dodecyl diphenyl ether disulfonate, sodium dialkyl sulfosuccinate, sodium dodecylbenzenesulfonate (i.e., sodium laurylbenzenesulfonate), and sodium hexadecylbenzenesulfonate; and aliphatic sulfonic acid salts such as sodium dodecylsulfonate (i.e., sodium lauryl sulfonate) and sodium tetradecylsulfonate. Moreover, a reactive emulsifier having an unsaturated bond may be used. One of these emulsifiers may be used individually, or two or more of these emulsifiers may be used in combination in a freely selected ratio.

Examples of dispersants that may be used include, but are not specifically limited to, known dispersants such as sodium alkylbenzenesulfonates (for example, sodium dodecylbenzenesulfonate). One dispersant may be used individually, or two or more dispersants may be used in combination in a freely selected ratio.

Examples of chain transfer agents that may be used include, but are not specifically limited to, alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram compounds such as tetramethylthiuram disulfide, tetraethylthiuram disulfide, and tetramethylthiuram monosulfide; phenolic compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; thioglycolic acid; thiomalic acid; 2-ethylhexyl thioglycolate; diphenylethylene; and α-methylstyrene dimer. One of these chain transfer agents may be used individually, or two or more of these chain transfer agents may be used in combination.

<<Weight Average Molecular Weight>>

The weight average molecular weight of the water-soluble polymer is preferably $0.01 \times 10^6$ or more, more preferably $1.00 \times 10^6$ or more, and even more preferably $5.00 \times 10^6$ or more, and is preferably $20.0 \times 10^6$ or less, more preferably $13.0 \times 10^6$ or less, and even more preferably $10.0 \times 10^6$ or less. When the weight average molecular weight of the water-soluble polymer is $0.01 \times 10^6$ or more, close adherence of an electrode produced using the water-soluble polymer and cycle characteristics of a secondary battery produced using the water-soluble polymer can be further improved, and change in shape, such as electrode swelling, can be further inhibited even upon repeated charging and discharging. Moreover, a water-soluble polymer having appropriate viscosity can easily be produced when the weight average molecular weight of the water-soluble polymer is $20.0 \times 10^6$ or less. Furthermore, reduction of the total amount Ts of solids in a slurry composition produced using the water-soluble polymer and migration of composition components in association with this reduction in Ts can be inhibited without excessively increasing the viscosity of the water-soluble polymer, which enables further improvement of close adherence (peel strength) of an electrode mixed material layer and a current collector in a produced electrode and cycle characteristics of a secondary battery, and further inhibition of electrode swelling after repeated cycling.

<Production Method of Binder Composition>

No specific limitations are placed on the method by which the binder composition is produced so long as the water-soluble polymer including the (meth)acrylamide monomer unit in a specific proportion and a specific amount of the amine compound are included. Moreover, the binder composition may be produced with further inclusion of other components besides the water-soluble polymer and the amine compound. The binder composition is normally obtained by adding these components to a solvent or the like and mixing them therewith by any method, with optional pH adjustment. Note that any of the above-described solvents that may be used for the water-soluble polymer may be used as a dispersion medium in the binder composition.

<<Other Components>>

Examples of other components that may be used include components such as reinforcing materials, leveling agents, viscosity modifiers, and additives for electrolysis solution. These other components are not specifically limited so long as they do not affect the battery reactions and may be selected from commonly known components such as those described in WO 2012/115096 A1. One of such components may be used individually, or two or more of such components may be used in combination in a freely selected ratio.

(Slurry Composition for Non-Aqueous Secondary Battery Electrode)

A feature of a presently disclosed slurry composition for a non-aqueous secondary battery electrode is the inclusion of an electrode active material and any of the binder compositions for a non-aqueous secondary battery electrode set forth above. The slurry composition for a non-aqueous secondary battery electrode may optionally further contain other components in addition to the electrode active material and the binder composition. Examples of other components that may be further contained in the slurry composition include the same components as described in relation to the production method of the binder composition.

As a result of the presently disclosed slurry composition for a non-aqueous secondary battery electrode containing specific amounts of the water-soluble polymer including the (meth)acrylamide monomer unit and the amine compound set forth above, close adherence of an electrode produced using the slurry composition and cycle characteristics of a secondary battery including the electrode are good, and change in electrode shape after repeated cycling is small.

Although the following describes, as one example, a case in which the slurry composition for a non-aqueous secondary battery electrode is a slurry composition for a lithium ion secondary battery electrode, the present disclosure is not limited to the following example.

<Electrode Active Material>

The electrode active material is a material that accepts and donates electrons in an electrode of a secondary battery. In the case of a positive electrode active material for a lithium ion secondary battery, a material that occludes and releases lithium is normally used.

<<Negative Electrode Active Material>>

Specific examples of negative electrode active materials that may be used include, but are not specifically limited to, a carbon-based negative electrode active material, a metal-based negative electrode active material, and a negative electrode active material that is a combination thereof.

Examples of carbonaceous materials that may constitute the carbon-based negative electrode active material include graphitizing carbon and non-graphitizing carbon typified by glassy carbon that has a structure similar to an amorphous structure.

The graphitizing carbon may be a carbon material made using tar pitch obtained from petroleum or coal as a raw material. Specific examples of the graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials that may constitute the carbon-based negative electrode active material include graphite such as natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferable. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

Of the negative electrode active materials described above, a carbon-based negative electrode active material is preferable, natural graphite is more preferable, and a carbon-based negative electrode active material of natural graphite coated with a low crystallinity carbon material (hereinafter, also referred to as an "amorphous coating") is even more preferable. The method of amorphous coating may, for example, be a method disclosed in JP 2013-45714 A.

<<Positive Electrode Active Material>>

Examples of positive electrode active materials that may be used include, but are not specifically limited to, known positive electrode active materials such as lithium-containing cobalt oxide ($LiCoO_2$), lithium manganate ($LiMn_2O_4$), lithium-containing nickel oxide ($LiNiO_2$), a lithium-containing composite oxide of Co—Ni—Mn ($Li(Co\ Mn\ Ni)O_2$), a lithium-containing composite oxide of Ni—Mn—Al, a lithium-containing composite oxide of Ni—Co—Al, olivine-type lithium iron phosphate ($LiFePO_4$), olivine-type manganese lithium phosphate ($LiMnPO_4$), a $Li_2MnO_3$—$LiNiO_2$-based solid solution, a lithium rich spinel compound represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally used positive electrode active materials.

<Production Method of Slurry Composition>

The slurry composition may be produced, for example, by mixing the above-described electrode active material, binder composition, and optional solvent and other components. The method by which these components are mixed is not specifically limited and may be a known method. The known mixing method may, for example, be a method in which the above-described components, the solvent, and so forth are mixed using a mixer such as a ball mill, a sand mill, a bead mill, a pigment disperser, a grinding machine, an ultrasonic disperser, a homogenizer, a planetary mixer, or a FILMIX to produce the slurry composition. In a case in which the slurry composition is produced using a dispersion liquid containing the water-soluble polymer, a liquid component contained in the dispersion liquid may be used as a dispersion medium of the slurry composition.

(Electrode for Non-Aqueous Secondary Battery)

A feature of a presently disclosed electrode for a non-aqueous secondary battery is that the electrode is produced using the presently disclosed slurry composition for a non-aqueous secondary battery electrode set forth above. In the present disclosure, the presently disclosed slurry composition for a non-aqueous secondary battery electrode may be used to produce only a positive electrode, may be used to produce only a negative electrode, or may be used to produce both a positive electrode and a negative electrode. In particular, it is preferable that the presently disclosed slurry composition for a non-aqueous secondary battery electrode is used to produce a negative electrode. In the case of a positive electrode, a positive electrode mixed material layer is normally formed on a current collector, whereas a negative electrode mixed material layer is normally formed on a current collector in the case of a negative electrode.

Production of the presently disclosed electrode for a non-aqueous secondary battery using the presently disclosed slurry composition for a non-aqueous secondary battery electrode set forth above may, for example, enable high close adherence between a current collector and an electrode mixed material layer formed on the current collector. Moreover, change in shape, such as swelling, of the electrode produced using the slurry composition is inhibited even after repeated secondary battery charging and discharging, and a secondary battery including the electrode has excellent cycle characteristics.

<Current Collector>

The current collector is a material having electrical conductivity and electrochemical durability. Specifically, the current collector may, for example, be a current collector that is made of a metal material such as iron, copper, aluminum, nickel, stainless steel, titanium, tantalum, gold, or platinum. One of the aforementioned materials may be used individually, or two or more of the aforementioned materials may be used in combination in a freely selected ratio. Of these current collectors, a thin film made of aluminum is preferable as a current collector used in production of a positive electrode, whereas a thin film made of copper is preferable as a current collector used in production of a negative electrode.

<Formation Method of Electrode Mixed Material Layer>

The electrode may be produced, for example, through a step of applying the slurry composition for an electrode set forth above onto the current collector (application step) and a step of drying the slurry composition for an electrode that has been applied onto the current collector to form an electrode mixed material layer on the current collector (drying step).

<<Application Step>>

The slurry composition for an electrode can be applied onto the current collector by a commonly known method without any specific limitations. Specific examples of application methods that can be used include doctor blading, dip coating, reverse roll coating, direct roll coating, gravure coating, extrusion coating, and brush coating. The slurry composition for an electrode may be applied onto one side or both sides of the current collector. The thickness of the slurry coating on the current collector after application but before drying may be set as appropriate in accordance with the thickness of the electrode mixed material layer to be obtained after drying.

<<Drying Step>>

The slurry composition for an electrode on the current collector may be dried by a commonly known method without any specific limitations. Examples of drying methods that can be used include drying by warm, hot, or low-humidity air; drying in a vacuum; and drying by irradiation with infrared light, an electron beam, or the like. Through drying of the slurry composition for an electrode on the current collector in this manner, an electrode mixed material layer can be formed on the current collector, and an electrode including the current collector and the electrode mixed material layer can be obtained.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Non-Aqueous Secondary Battery)

A feature of a presently disclosed non-aqueous secondary battery is the inclusion of a positive electrode, a negative electrode, a separator, and an electrolysis solution, wherein the positive electrode or the negative electrode is the presently disclosed electrode for a non-aqueous secondary battery set forth above. In other words, the presently disclosed non-aqueous secondary battery may include a positive electrode that is the presently disclosed electrode for a non-aqueous secondary battery and a negative electrode that is another known negative electrode, may include a negative electrode that is the presently disclosed electrode for a non-aqueous secondary battery and a positive electrode that is another known positive electrode, or may include a positive electrode and a negative electrode that are both the presently disclosed electrode for a non-aqueous secondary battery. In particular, it is preferable that the negative electrode of the secondary battery is the presently disclosed electrode for a non-aqueous secondary battery.

As a result of the presently disclosed non-aqueous secondary battery including the presently disclosed electrode for a non-aqueous secondary battery, the presently disclosed non-aqueous secondary battery has good cycle characteristics, can inhibit electrode swelling or the like even upon repeated charging and discharging, and has excellent life characteristics.

Although the following describes, as one example, a case in which the non-aqueous secondary battery is a lithium ion secondary battery, the present disclosure is not limited to the following example.

<Known Electrode>

In the presently disclosed non-aqueous secondary battery, the positive electrode may be a known positive electrode in a case in which only the negative electrode is the presently disclosed electrode for a non-aqueous secondary battery, and the negative electrode may be a known negative electrode in a case in which only the positive electrode is the presently disclosed electrode for a non-aqueous secondary battery.

Examples of known positive/negative electrodes that may be used include, but are not specifically limited to, a positive/negative electrode formed from a thin plate of metal and a positive/negative electrode including a current collector and a positive/negative electrode mixed material layer formed on the current collector. A positive electrode mixed material layer normally contains a positive electrode active material, a conductive material, and a binder. A negative electrode mixed material layer normally contains a negative electrode active material and a binder, and may optionally further contain a conductive material. The current collector, the positive/negative electrode active material, and the method of formation of the positive/negative electrode mixed material layer on the current collector may, for example, be any of the previously described current collectors, positive/negative electrode active materials, and formation methods. Moreover, the binder, conductive material, dispersion medium, and so forth may, for example, be any of those described in JP 2013-145763 A.

<Electrolysis Solution>

The electrolysis solution is normally an organic electrolysis solution obtained by dissolving a supporting electrolyte in an organic solvent. For example, when the non-aqueous secondary battery is a lithium ion secondary battery, a lithium salt is used as the supporting electrolyte. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte dissolves therein. Suitable examples of organic solvents that may be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region, and a mixture of ethylene carbonate and ethyl methyl carbonate is more preferable.

Moreover, known additives such as vinylene carbonate (VC), fluoroethylene carbonate (FEC), and ethyl methyl sulfone may be added to the electrolysis solution.

<Separator>

Examples of separators that may be used include, but are not specifically limited to, microporous membranes in which a polyolefinic (polyethylene, polypropylene, polybutene, or polyvinyl chloride) resin is used; microporous membranes in which a polyethylene terephthalate, polycycloolefin, polyethersulfone, polyamide, polyimide, polyimide-amide, polyaramid, polycycloolefin, nylon, or polytetrafluoroethylene resin or the like is used; woven or non-woven fabric in which polyolefin fiber is used; and aggregates of particles formed from an insulating material. Of these separators, a microporous membrane in which a polyolefinic (polyethylene, polypropylene, polybutene, or polyvinyl chloride) resin is used is preferred because such a membrane can reduce the total thickness of the separator, which increases the ratio of electrode mixed material layer in the non-aqueous secondary battery, and consequently increases the capacity per volume. Of such microporous membranes, a microporous membrane formed from a polypropylene resin is more preferable.

<Assembly Step>

The battery members of the secondary battery, such as the positive electrode, the negative electrode, and the separator, are normally positioned such that the positive electrode is in contact with one side of the separator and the negative electrode is in contact with the other side of the separator. More specifically, the positive electrode mixed material layer side is positioned at one side of the separator and the negative electrode mixed material layer side is positioned at the other side of the separator such that the positive and negative electrode mixed material layers are in contact with the separator. The secondary battery may be produced, for example, by injecting these battery members with the electrolysis solution.

Moreover, the presently disclosed non-aqueous secondary battery can be produced by a known assembly method without any specific limitations. Specifically, the presently disclosed non-aqueous secondary battery may be produced by, for example, performing rolling, folding, or the like of the negative electrode, positive electrode, and separator obtained as described above in accordance with the battery shape as necessary to place these battery members in a battery container, injecting the electrolysis solution into the battery container, and sealing the battery container. In order to prevent pressure increase inside the non-aqueous secondary battery and occurrence of overcharging or overdischarging, an overcurrent preventing device such as a fuse or a PTC device, an expanded metal, or a lead plate may be provided as necessary. The shape of the secondary battery may be a coin type, button type, sheet type, cylinder type, prismatic type, flat type, or the like.

<After-Treatment>

In production of the secondary battery, after-treatment may be performed in which, for example, a secondary battery assembled as described above is charged to a specific depth of charge (initial charging treatment), and then the initially charged non-aqueous secondary battery is stored for a specific time in a heated state (aging treatment).

In a situation in which the secondary battery is subjecting to aging treatment, the heating temperature may, for example, be 25° C. or higher, preferably 40° C. or higher, and more preferably 55° C. or higher, and may be 85° C. or lower, and preferably 70° C. or lower. The heating holding time of the heated secondary battery may, for example, be 1 hour or more, preferably 5 hours or more, and more preferably 10 hours or more, and may be 50 hours or less.

EXAMPLES

The following provides a more specific description of the present disclosure based on examples. However, the present disclosure is not limited to the following examples. In the following description, "%" and "parts" used in expressing quantities are by mass, unless otherwise specified.

The weight average molecular weight and change in viscosity of a water-soluble polymer, the close adherence between an electrode mixed material layer and a current collector in an electrode, the cycle characteristics of a secondary battery, and the post-cycling change in shape of an electrode were calculated, measured, and evaluated by the following methods.

<Weight Average Molecular Weight>

The weight average molecular weight of a water-soluble polymer was measured by gel permeation chromatography (GPC). Specifically, a measurement sample was prepared by diluting an aqueous solution of a water-soluble polymer obtained to a solid content of 0.05 mass %. The weight average molecular weight was then calculated as a reference substance equivalent value by preparing a calibration curve for the reference substance. The measurement conditions were as shown below. The results are shown in Table 1.

Apparatus: Gel permeation chromatograph (produced by Tosoh Corporation; pump: DP-8020 (product name); autosampler: AS-8020 (product name); detector: RI-8020 (product name))

Column: Produced by Showa Denko K. K.; product name: Shodex OHpak (SB-G, SB-807HQ, SB-806MHQ)

Mobile phase: 0.1 M Tris buffer solution (pH 9.0)+0.1 M potassium chloride

Flow rate: 0.5 mL/min

Injection volume: 0.2 mL

Temperature: 40° C.

Detector: Differential refractive index (RI) detector

Reference substance: Monodisperse pullulan

<Change in Viscosity of Water-Soluble Polymer>

The change in viscosity of a water-soluble polymer was evaluated by determining the percentage change in viscosity when an aqueous solution containing the water-soluble polymer was subjected to a storage test. Specifically, the viscosity A1 of an obtained water-soluble polymer-containing aqueous solution (solid content concentration 5.0%) was measured. Next, the water-soluble polymer-containing aqueous solution was stored for 1 month in an environment having a temperature of 25° C., and the post-storage viscosity A2 of the water-soluble polymer was measured. Note that each of the viscosities A1 and A2 was a viscosity measured using a B-type viscometer (produced by Toki Sangyo Co., Ltd.; product name: TVB-10; rotation speed: 60 rpm) in an environment having a temperature of 25° C.

The percentage change in viscosity was calculated by: Percentage change in viscosity=$\{(A1-A2)/A1\} \times 100(\%)$. Measurement was performed in the same manner three times and an average value of the percentage change in viscosity was used for evaluation by the following standard. A smaller average value for the percentage change in viscosity indicates that the percentage change in viscosity of the water-soluble polymer resulting from storage is small and that the water-soluble polymer has high storage stability.

The results are shown in Table 1.

A: Average value for percentage change in viscosity of less than 5.0%

B: Average value for percentage change in viscosity of at least 5.0% and less than 10.0%

C: Average value for percentage change in viscosity of 10.0% or more

<Close Adherence of Electrode>

As described below, close adherence of an electrode was evaluated as peel strength between a negative electrode mixed material layer and a current collector in Examples 1 to 8 and Comparative Examples 1 to 4, and was evaluated as peel strength between a positive electrode mixed material layer and a current collector in Example 9.

<<Close Adherence of Negative Electrode Mixed Material Layer and Current Collector>>

Specifically, a produced negative electrode was cut out as a rectangular shape of 100 mm in length and 10 mm in width to obtain a specimen. Next, the specimen was placed with the surface at which the negative electrode mixed material layer was located underneath, and cellophane tape (tape prescribed by JIS Z1522) was attached to the surface of the negative electrode mixed material layer. One end of the current collector was then pulled in a vertical direction at a pulling speed of 50 mm/min, and the stress during peeling of the current collector was measured. Note that the cellophane tape was secured to a test bed. Measurement was performed in the same manner three times. The average value of the measured stress was taken to be the peel strength (N/m) and was evaluated by the following standard. A larger value for the peel strength indicates better close adherence between the negative electrode mixed material layer and the current collector. The results are shown in Table 1.

A: Peel strength of 15.0 N/m or more

B: Peel strength of at least 10.0 N/m and less than 15.0 N/m

C: Peel strength of less than 10.0 N/m

<<Close Adherence of Positive Electrode Mixed Material Layer and Current Collector>>

A produced positive electrode was cut out as a rectangular shape of 100 mm in length and 10 mm in width to obtain a specimen. Next, the specimen was placed with the surface at which the positive electrode mixed material layer was located underneath, and cellophane tape (tape prescribed by JIS Z1522) was attached to the surface of the positive electrode mixed material layer. One end of the current collector was then pulled in a vertical direction at a pulling speed of 50 mm/min, and the stress during peeling of the current collector was measured. Note that the cellophane tape was secured to a test bed. Measurement was performed in the same manner three times. The average value of the measured stress was taken to be the peel strength (N/m) and was evaluated by the following standard. A larger value for the peel strength indicates better close adherence between the positive electrode mixed material layer and the current collector. The results are shown in Table 1.

A: Peel strength of 40.0 N/m or more

B: Peel strength of at least 30.0 N/m and less than 40.0 N/m

C: Peel strength of less than 30.0 N/m

<Cycle Characteristics>

A produced lithium ion secondary battery was left at rest for 5 hours in a state with electrodes immersed in an electrolysis solution in an environment having a temperature of 25° C. Next, the secondary battery that had been left at rest was charged to a cell voltage of 3.65 V by a constant-current method with a rate of 0.2 C in an environment having a temperature of 25° C. Thereafter, the charged secondary battery was subjected to 12 hours of aging treatment in an environment having a temperature of 60° C. The secondary battery that had been subjected to aging treatment was discharged to a cell voltage of 3.00 V by a constant-current method with a rate of 0.2 C in an environment having a temperature of 25° C. Thereafter, the discharged secondary battery was subjected to constant-current constant-voltage charging (upper limit cell voltage: 4.20 V) by a constant-current method with a rate of 0.2 C, and was then subjected to constant-current discharging to a cell voltage of 3.00 V by a constant-current method with a rate of 0.2 C. The capacity in this discharging was measured as the initial discharge capacity X1.

Next, the secondary battery that had been subjected to initial discharging was subjected to 50 cycles of a first charge/discharge operation with conditions of a cell voltage of 4.20 V to 3.00 V and a charge/discharge rate of 1.0 C in an environment having a temperature of 45° C. The secondary battery that had been subjected to 50 cycles of the first charging/discharging was subsequently subjected to 50 cycles of a second charge/discharge operation with conditions of a cell voltage of 4.20 V to 3.00 V and a charge/discharge rate of 0.5 C in an environment having a temperature of 0° C. Thereafter, the secondary battery that had been subjected to 50 cycles of the second charging/discharging was subjected to constant-current constant-voltage charging (upper limit cell voltage: 4.20 V) by a constant-current method with a rate of 0.2 C in an environment having a temperature of 25° C., and was then discharged to a cell voltage of 3.00 V by a constant-current method with a rate of 0.2 C. The capacity in this discharging was measured as discharge capacity X2.

The capacity maintenance rate was then determined by: Capacity maintenance rate $\Delta C=(X2/X1)\times 100(\%)$, using the initial discharge capacity X1 and the discharge capacity X2 that were measured, and was evaluated by the following standard. A larger value for the capacity maintenance rate $\Delta C$ indicates better cycle characteristics and longer secondary battery service life. The results are shown in Table 1.

A: Capacity maintenance rate $\Delta C$ of 80% or more
B: Capacity maintenance rate $\Delta C$ of at least 75% and less than 80%
C: Capacity maintenance rate $\Delta C$ of at least 70% and less than 75%
D: Capacity maintenance rate $\Delta C$ of less than 70%

<Post-Cycling Change in Electrode Shape>

The change in shape of an electrode after repeated cycling of a produced secondary battery was evaluated by evaluating post-cycling change in thickness in a negative electrode in Examples 1 to 8 and Comparative Examples 1 to 4, and by evaluating post-cycling change in thickness in a positive electrode in Example 9.

<<Change in Negative Electrode Shape>>

Specifically, a produced lithium ion secondary battery was first left at rest for 5 hours in a state with electrodes immersed in an electrolysis solution in an environment having a temperature of 25° C. Next, the secondary battery that had been left at rest was charged to a cell voltage of 3.65 V by a constant-current method with a rate of 0.2 C in an environment having a temperature of 25° C. Thereafter, the charged secondary battery was subjected to 12 hours of aging treatment in an environment having a temperature of 60° C. The secondary battery that had been subjected to aging treatment was discharged to a cell voltage of 3.00 V by a constant-current method with a rate of 0.2 C in an environment having a temperature of 25° C.

The lithium ion secondary battery that had been subjected to aging treatment and discharging treatment was then disassembled. A value excluding the thickness of the current collector from the overall thickness of the negative electrode was measured as the pre-cycling negative electrode thickness (d0). Next, the lithium ion secondary battery was reassembled and, after being subjected to 50 cycles of a first charge/discharge operation as described in the preceding cycle characteristics section, was charged at a rate of 1 C in an environment having a temperature of 25° C. The secondary battery was disassembled in a charged state to remove the negative electrode. A value excluding the thickness of the current collector from the overall thickness of the negative electrode was measured as the post-cycling negative electrode thickness (d2). The percentage change of the post-cycling negative electrode thickness d2 relative to the pre-cycling negative electrode thickness d0 was determined as: Percentage change in post-cycling electrode shape={(d2−d0)/d0}×100(%), and was judged by the following standard. A smaller percentage change in post-cycling electrode shape indicates that swelling of the negative electrode is small even upon repeated charge/discharge cycling and that the secondary battery has a long service life. The results are shown in Table 1.

A: Percentage change in post-cycling electrode shape of less than 25%
B: Percentage change in post-cycling electrode shape of at least 25% and less than 30%
C: Percentage change in post-cycling electrode shape of at least 30% and less than 35%
D: Percentage change in post-cycling electrode shape of 35% or more <<Change in Positive Electrode Shape>>

A lithium ion secondary battery that had been subjecting to aging treatment and discharging treatment in the same manner as for change in negative electrode shape was disassembled. A value excluding the thickness of the current collector from the overall thickness of the positive electrode was measured as the pre-cycling positive electrode thickness (d0'). Next, the lithium ion secondary battery was reassembled and, after being subjected to 50 cycles of a first charge/discharge operation as described in the preceding cycle characteristics section, was charged at a rate of 1 C in an environment having a temperature of 25° C. The secondary battery was disassembled in a charged state to remove the positive electrode. A value excluding the thickness of the current collector from the overall thickness of the positive electrode was measured as the post-cycling positive electrode thickness (d2'). The percentage change of the post-cycling positive electrode thickness d2' relative to the pre-cycling positive electrode thickness d0' was determined as: Percentage change in post-cycling electrode shape={(d2'−d0')/d0'}×100(%), and was judged by the following standard. A smaller percentage change in post-cycling electrode shape indicates that swelling of the positive electrode is small even upon repeated charge/discharge cycling and that the secondary battery has a long service life. The results are shown in Table 1.

A: Percentage change in post-cycling electrode shape of less than 3%
B: Percentage change in post-cycling electrode shape of at least 3% and less than 5%

C: Percentage change in post-cycling electrode shape of at least 5% and less than 7%

D: Percentage change in post-cycling electrode shape of 7% or more

Example 1

<Production of Aqueous Solution Containing Water-Soluble Polymer>

A 1 L flask equipped with a septum was charged with 712 g of deionized water. The deionized water was heated to a temperature of 40° C., and the inside of the flask was purged with nitrogen gas at a flow rate of 100 mL/min. Next, 28.5 g of acrylamide as a (meth)acrylamide monomer (equivalent to 75.0 mass % relative to 100 mass % of all monomer units of the finally obtained water-soluble polymer) and 9.5 g of acrylic acid as another monomer (equivalent to 25.0 mass % relative to 100 mass % of all monomer units of the finally obtained water-soluble polymer) were mixed and then injected into the flask using a syringe. Thereafter, 8.0 g of 2.5% potassium persulfate aqueous solution was added to the flask as a polymerization initiator using a syringe. In addition, 40 g of 2.0% tetramethylethylenediamine aqueous solution was added 15 minutes later as a polymerization accelerator using a syringe. After 4 hours had passed, 4.0 g of 2.5% potassium persulfate aqueous solution was added to the flask as a polymerization initiator, 20 g of 2.0% tetramethylethylenediamine aqueous solution was further added as a polymerization accelerator, heating was performed to a temperature of 60° C., and a polymerization reaction was carried out. After 3 hours had passed, the flask was opened to air to terminate the polymerization reaction, and the resultant product was deodorized at a temperature of 80° C. to remove residual monomers from the product and thereby obtain an aqueous solution containing a water-soluble polymer.

The resultant water-soluble polymer-containing aqueous solution was used in measurement of the weight average molecular weight of the water-soluble polymer by the previously described method. The results are shown in Table 1.

<Production of Binder Composition for Non-Aqueous Secondary Battery Electrode>

The water-soluble polymer-containing aqueous solution obtained as described above was adjusted to pH 8 using 10% lithium hydroxide aqueous solution. Next, hydroxylamine sulfate as an amine compound was added to the water-soluble polymer-containing aqueous solution that has been pH adjusted in an amount of 0.1 parts by mass per 100 parts by mass of solid content of the finally obtained water-soluble polymer, and stirring was performed to thereby produce a binder composition. In addition, the obtained binder composition was stored for one month in an environment having a temperature of 25° C.

The resultant binder composition was used in measurement and evaluation of the change in viscosity of the water-soluble polymer contained in the binder composition by the previously described method. The results are shown in Table 1.

<Production of Slurry Compositions for Non-Aqueous Secondary Battery Electrodes>

<<Production of Slurry Composition for Non-Aqueous Secondary Battery Negative Electrode>>

A planetary mixer was charged with 100 parts of amorphous-coated natural graphite (theoretical capacity: 350 mAh/g) as a negative electrode active material, 1 part of acetylene black (produced by Denki Kagaku Kogyo Kabushiki Kaisha; product name: HS-100) as a conductive material, and 1.50 parts in terms of solid content of the water-soluble polymer-containing aqueous solution (solid content concentration: 5.0 mass %) that had been stored as previously described as a binder composition, and these materials were diluted to a solid content concentration of 60 mass % using deionized water. Next, the diluted materials were kneaded for 60 minutes at a rotation speed of 45 rpm to obtain a mixture. Deionized water was added to the obtained mixture to adjust the viscosity to 1100±100 mPa·s as measured by the same B-type viscometer (rotation speed: 12 rpm) as previously described, and thereby produce a slurry composition for a non-aqueous secondary battery negative electrode.

<Production of Negative Electrode for Non-Aqueous Secondary Battery>

The slurry composition for a negative electrode obtained as described above was applied onto copper foil (thickness: 15 μm) serving as a current collector by a comma coater such that the applied amount was 9 mg/cm$^2$ to 10 mg/cm$^2$ and was then dried to form a negative electrode mixed material layer on the current collector. This drying was performed by conveying the copper foil having the slurry composition for a negative electrode applied thereon inside an oven having a temperature of 70° C. for 2 minutes at a speed of 0.5 m/min. The current collector on which the negative electrode mixed material layer had been formed was subsequently heat treated for 2 minutes at a temperature of 120° C. to obtain a negative electrode web. Next, the obtained negative electrode web was pressed to a density of 1.50 g/cm$^3$ to 1.60 g/cm$^3$ by a roll press. In this manner, a negative electrode having a negative electrode mixed material layer formed at one side thereof was obtained.

Close adherence of the negative electrode mixed material layer and the current collector in the produced negative electrode was evaluated by the previously described method. The results are shown in Table 1.

<<Production of Slurry Composition for Non-Aqueous Secondary Battery Positive Electrode>>

A slurry composition for a positive electrode was obtained by charging a planetary mixer with 100 parts of LiCoO$_2$ as a positive electrode active material, 2 parts of acetylene black (produced by Denki Kagaku Kogyo Kabushiki Kaisha; product name: HS-100) as a conductive material, and 2 parts of polyvinylidene fluoride (PVDF; produced by Kureha Corporation; product name: KF-1100) as a binder, and further adding and mixing N-methylpyrrolidone to adjust the total solid content concentration to 67 mass %.

<Production of Positive Electrode for Non-Aqueous Secondary Battery>

The slurry composition for a positive electrode obtained as described above was applied onto aluminum foil (thickness: 20 μm) serving as a current collector by a comma coater and was then dried to form a positive electrode mixed material layer on the current collector. This drying was performed by conveying the aluminum foil onto which the slurry composition for a positive electrode had been applied inside an oven having a temperature of 60° C. for 2 minutes at a speed of 0.5 m/min. The current collector on which the positive electrode mixed material layer had been formed was subsequently heat treated for 2 minutes at a temperature of 120° C. to obtain a positive electrode web.

The obtained positive electrode web was pressed to a density of 3.10 g/cm$^3$ to 3.20 g/cm$^3$ by a roll press. In this manner, a positive electrode having a positive electrode mixed material layer formed at one side thereof was obtained.

<Assembly of Non-Aqueous Secondary Battery>

A single layer separator made of polypropylene (width: 65 mm; length 500 mm; thickness: 25 μm; produced by dry method; porosity: 55%) was prepared and was cut out as a square shape of 5 cm×5 cm. An aluminum packing case was also prepared as a battery case.

The positive electrode produced as described above was cut out as a square shape of 4 cm×4 cm and was positioned with a surface at the current collector side of the positive electrode in contact with the aluminum packing case. Next, the square separator was positioned on a surface at the positive electrode mixed material layer side of the positive electrode. The negative electrode produced as described above was cut out as a square shape of 4.2 cm×4.2 cm and was positioned on a surface of the separator that was not in contact with the positive electrode mixed material layer such that a surface at the negative electrode mixed material layer side of the negative electrode faced toward the separator. The aluminum packing case was subsequently filled with a $LiPF_6$ solution of 1.0 M in concentration (solvent: ethylene carbonate/ethyl methyl carbonate=3/7 (volume ratio); additive: 2 mass % (solvent ratio) vinylene carbonate) as an electrolysis solution. Next, the aluminum packing case was heat sealed at 150° C. to tightly close an opening of the aluminum packing case and thereby produce a lithium ion secondary battery as a non-aqueous secondary battery.

Cycle characteristics and change in post-cycling negative electrode shape were evaluated for the produced lithium ion secondary battery by the previously described methods. The results are shown in Table 1.

Example 2

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of hydroxylamine sulfate used as an amine compound in production of the binder composition for a non-aqueous secondary battery electrode was changed to 0.05 parts by mass per 100 parts by mass of solid content of the water-soluble polymer.

Measurements and evaluations were performed in the same way as in Example 1. The results are shown in Table 1.

Example 3

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of hydroxylamine sulfate used as an amine compound in production of the binder composition for a non-aqueous secondary battery electrode was changed to 0.3 parts by mass per 100 parts by mass of solid content of the water-soluble polymer.

Measurements and evaluations were performed in the same way as in Example 1. The results are shown in Table 1.

Example 4

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of acrylamide as a (meth)acrylamide monomer was changed to 24.7 g (equivalent to 65.0 mass % relative to 100 mass % of all monomer units of the finally obtained water-soluble polymer) and the content of acrylic acid was changed to 9.5 g (equivalent to 35.0 mass % relative to 100 mass % of all monomer units of the finally obtained water-soluble polymer) in production of the aqueous solution containing the water-soluble polymer.

Measurements and evaluations were performed in the same way as in Example 1. The results are shown in Table 1.

Example 5

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of acrylamide as a (meth)acrylamide monomer was changed to 19.0 g (equivalent to 50.0 mass % relative to 100 mass % of all monomer units of the finally obtained water-soluble polymer) and the content of acrylic acid was changed to 19.0 g (equivalent to 50.0 mass % relative to 100 mass % of all monomer units of the finally obtained water-soluble polymer) in production of the aqueous solution containing the water-soluble polymer.

Measurements and evaluations were performed in the same way as in Example 1. The results are shown in Table 1.

Example 6

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that in production of the aqueous solution containing the water-soluble polymer, the charged amount of 2.5% potassium persulfate aqueous solution that was initially added after mixing of acrylamide and acrylic acid was changed to 12.0 g, and the weight average molecular weight of the water-soluble polymer was adjusted to a value shown in Table 1.

Measurements and evaluations were performed in the same way as in Example 1. The results are shown in Table 1.

Example 7

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that diethylhydroxylamine was used as an amine compound in production of the binder composition for a non-aqueous secondary battery electrode.

Measurements and evaluations were performed in the same way as in Example 1. The results are shown in Table 1.

Example 8

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that N-isopropylhydroxylamine was used as an amine compound in production of the binder composition for a non-aqueous secondary battery electrode.

Measurements and evaluations were performed in the same way as in Example 1. The results are shown in Table 1.

Example 9

A water-soluble polymer, a binder composition for a non-aqueous secondary battery electrode, a negative electrode, a positive electrode, and a non-aqueous secondary battery were produced in the same way as in Example with the exception that in production of slurry compositions for non-aqueous secondary battery electrodes, a slurry composition for a positive electrode and a slurry composition for a negative electrode were produced as follows.

Measurements and evaluations were performed in the same way as in Example 1. The results are shown in Table 1.

<Production of Slurry Composition for Non-Aqueous Secondary Battery Positive Electrode>

A planetary mixer was charged with 100 parts of lithium cobalt oxide (theoretical capacity: 150 mAh/g) as a positive electrode active material, 3 parts of acetylene black (produced by Denki Kagaku Kogyo Kabushiki Kaisha; product name: HS-100) as a conductive material, and 4.00 parts in terms of solid content of the water-soluble polymer-containing aqueous solution (solid content concentration: 5.0 mass %) that had been stored as previously described as a binder composition, and these materials were diluted to a solid content concentration of 60 mass % using deionized water. Next, the diluted materials were kneaded for 60 minutes at a rotation speed of 45 rpm to obtain a mixture. Deionized water was added to the obtained mixture to adjust the viscosity to 4000±300 mPa·s as measured by the same B-type viscometer (rotation speed: 60 rpm) as previously described, and thereby produce a slurry composition for a non-aqueous secondary battery positive electrode.

<Production of Slurry Composition for Non-Aqueous Secondary Battery Negative Electrode>

A planetary mixer was charged with 100 parts of amorphous-coated natural graphite (theoretical capacity: 350 mAh/g) as a negative electrode active material, 1 part of acetylene black (produced by Denki Kagaku Kogyo Kabushiki Kaisha; product name: HS-100) as a conductive material, and 1 part in terms of solid content of 1% carboxymethyl cellulose aqueous solution (produced by DKS Co., Ltd.; product name: BSH-12) as a dispersant. These materials were diluted to a solid content concentration of 60% using deionized water and were subsequently kneaded for 60 minutes at a rotation speed of 45 rpm. Next, the solid content concentration was adjusted to 52% using deionized water and mixing was performed for 30 minutes at a rotation speed of 45 rpm to obtain a mixed liquid.

Next, 1.0 parts in terms of solid content of a 40% styrene-butadiene copolymer water dispersion was added as a binder to the mixed liquid obtained as described above and was mixed therewith for 30 minutes at a rotation speed of 45 rpm to obtain a mixed liquid. Deionized water was added to the mixed liquid to adjust the viscosity to 1100±100 mPa·s as measured by the same B-type viscometer (rotation speed: 12 rpm) as previously described, and thereby produce a slurry composition for a lithium ion secondary battery negative electrode.

The styrene-butadiene copolymer water dispersion was produced as follows.

<<Production of Styrene-Butadiene Copolymer Water Dispersion>>

A 5 MPa pressure vessel equipped with a stirrer was charged with 33 parts of 1,3-butadiene, 3.5 parts of itaconic acid, and 63.5 parts of styrene as polymerizable monomers, 0.4 parts of sodium dodecylbenzenesulfonate as an emulsifier, 150 parts of deionized water, and 0.5 parts of potassium persulfate as a polymerization initiator. These materials were sufficiently stirred and were subsequently heated to 50° C. to initiate polymerization. When the polymerization conversion rate reached 96%, cooling was performed to terminate the reaction and yield a mixture containing a styrene-butadiene copolymer. The obtained mixture was adjusted to pH 8 through addition of 5% sodium hydroxide aqueous solution, was then subjected to thermal-vacuum distillation to remove unreacted monomers, and was subsequently cooled to 30° C. or lower to obtain a water dispersion of the styrene-butadiene copolymer.

Comparative Example 1

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that an amine compound was not used in production of the binder composition for a non-aqueous secondary battery electrode.

Measurements and evaluations were performed in the same way as in Example 1. The results are shown in Table 1.

Comparative Example 2

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of hydroxylamine sulfate used as an amine compound in production of the binder composition for a non-aqueous secondary battery electrode was changed to 0.005 parts by mass per 100 parts by mass of solid content of the water-soluble polymer.

Measurements and evaluations were performed in the same way as in Example 1. The results are shown in Table 1.

Comparative Example 3

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of hydroxylamine sulfate used as an amine compound in production of the binder composition for a non-aqueous secondary battery electrode was changed to 1.0 parts by mass per 100 parts by mass of solid content of the water-soluble polymer.

Measurements and evaluations were performed in the same way as in Example 1. The results are shown in Table 1.

Comparative Example 4

A water-soluble polymer, a binder composition for a non-aqueous secondary battery electrode, a slurry composition for a non-aqueous secondary battery negative electrode, a slurry composition for a non-aqueous secondary battery positive electrode, a negative electrode, a positive electrode, and a non-aqueous secondary battery were produced in the same way as in Example 1 with the exception that the content of acrylamide used as an acrylamide monomer in production of the aqueous solution containing the water-soluble polymer was changed to an amount equivalent to 30.0 mass % relative to 100 mass % of all monomer units of the finally obtained water-soluble polymer.

Measurements and evaluations were performed in the same way as in Example 1. The results are shown in Table 1.

TABLE 1

| | | | Example 1 | Example 2 | Example 3 | Example 4 | Example 5 | Example 6 | Example 7 |
|---|---|---|---|---|---|---|---|---|---|
| Binder composition for non-aqueous secondary battery electrode | Water-soluble polymer | Percentage content M0 of acrylamide monomer unit [mass %] | 75.0 | 75.0 | 75.0 | 65.0 | 50.0 | 75.0 | 75.0 |
| | Amine compound | Type | HA-S | HA-S | HA-S | HA-S | HA-S | HA-S | dEHA |
| | | Content M1 [parts by mass/ 100 parts by mass of solid content of water-soluble polymer] | 0.10 | 0.05 | 0.30 | 0.10 | 0.10 | 0.10 | 0.10 |
| | | $M = M1/M0$ $[\times 10^{-3}]$ | 1.33 | 0.67 | 4.00 | 1.54 | 2.00 | 1.33 | 1.33 |
| | | Weight average molecular weight $[\times 10^6]$ | 7.0 | 7.0 | 7.0 | 7.0 | 7.0 | 4.0 | 7.0 |
| | | Used electrode | Negative electrode | Negative electrode | Negative electrode | Negative electrode | Negative electrode | Negative electrode | Negative electrode |
| Evaluations | | Change in viscosity of water-soluble polymer | A | B | A | A | A | A | A |
| | | Electrode close adherence | A | A | A | A | A | B | A |
| | | Secondary battery cycle characteristics | A | B | B | B | B | B | A |
| | | Change in post-cycling electrode shape | A | A | A | A | B | B | A |

| | | | Example 8 | Example 9 | Comparative Example 1 | Comparative Example 2 | Comparative Example 3 | Comparative Example 4 |
|---|---|---|---|---|---|---|---|---|
| Binder composition for non-aqueous secondary battery electrode | Water-soluble polymer | Percentage content M0 of acrylamide monomer unit [mass %] | 75.0 | 75.0 | 75.0 | 75.0 | 75.0 | 30.0 |
| | Amine compound | Type | N-iPHA | HA-S | — | HA-S | HA-S | HA-S |
| | | Content M1 [parts by mass/ 100 parts by mass of solid content of water-soluble polymer] | 0.10 | 0.10 | — | 0.005 | 1.00 | 0.10 |
| | | $M = M1/M0$ $[\times 10^{-3}]$ | 1.33 | 1.33 | 0.00 | 0.07 | 13.33 | 3.33 |
| | | Weight average molecular weight $[\times 10^6]$ | 7.0 | 7.0 | 7.0 | 7.0 | 7.0 | 7.0 |
| | | Used electrode | Negative electrode | Positive electrode | Negative electrode | Negative electrode | Negative electrode | Negative electrode |
| Evaluations | | Change in viscosity of water-soluble polymer | B | A | C | C | A | A |
| | | Electrode close adherence | B | A | C | C | A | B |
| | | Secondary battery cycle characteristics | B | A | D | C | C | C |

| | | | | | | |
|---|---|---|---|---|---|---|
| Change in post-cycling electrode shape | A | A | D | C | A | C |

HA-S: Hydroxylamine sulfate
dEHA: Diethylhydroxylamine
N-iPHA: N-Isopropylhydroxylamine It can be seen from Table 1 that in Comparative Examples 1 and 2 in which an amine compound was not used or the amine compound content was less than 0.01 parts by mass per 100 parts by mass of solid content of the water-soluble polymer, change in viscosity of the water-soluble polymer increased, electrode close adherence and secondary battery cycle characteristics deteriorated, and post-cycling electrode swelling increased compared to Examples 1 to 9 in which the amine compound content was at least 0.01 parts by mass and not more than 0.5 parts by mass.

Moreover, in Comparative Example 3 in which the amine compound content exceeded 0.5 parts by mass per 100 parts by mass of solid content of the water-soluble polymer, secondary battery cycle characteristics deteriorated compared to Examples 1 to 9 in which the amine compound content was at least 0.01 parts by mass and not more than 0.5 parts by mass.

Furthermore, in Comparative Example 4 in which the percentage content of a (meth)acrylamide monomer unit was less than 40 mass %, electrode close adherence and secondary battery cycle characteristics deteriorated, and post-cycling electrode swelling increased compared to Examples 1 to 9 in which the percentage content of the (meth)acrylamide monomer unit was at least 40 mass % and not more than 100 mass %.

INDUSTRIAL APPLICABILITY

According to the present disclosure, it is possible to provide a binder composition that even when a water-soluble polymer including a (meth)acrylamide monomer unit is used, can inhibit change in viscosity of a water-soluble polymer including a (meth)acrylamide polymer over time.

Moreover, according to the present disclosure, it is possible to provide a binder composition that enables production of an electrode having excellent close adherence and a secondary battery that has excellent cycle characteristics and can inhibit change in battery shape even upon repeated charge/discharge cycling.

The invention claimed is:

1. A binder composition for a non-aqueous secondary battery electrode comprising:
a water-soluble polymer including a (meth)acrylamide monomer unit; and
an amine compound, wherein
percentage content M0 of the (meth)acrylamide monomer unit is at least 40 mass % and not more than 100 mass % relative to 100 mass % of all monomer units of the water-soluble polymer,
content M1 of the amine compound is at least 0.01 parts by mass and not more than 0.5 parts by mass per 100 parts by mass of solid content of the water-soluble polymer, and
a mass ratio M=M1/M0 calculated from the content M1 of the amine compound and the percentage content M0 of the (meth)acrylamide monomer unit is $1.00 \times 10^{-3}$ or more and $3.00 \times 10^{-3}$ or less.

2. The binder composition for a non-aqueous secondary battery electrode according to claim 1, wherein
the amine compound has a nitric oxide radical generating structure.

3. The binder composition for a non-aqueous secondary battery electrode according to claim 1, wherein
the amine compound is hydroxylamine sulfate or diethylhydroxylamine.

4. The binder composition for a non-aqueous secondary battery electrode according to claim 1, wherein
the water-soluble polymer has a weight average molecular weight of at least $0.01 \times 10^6$ and not more than $20.0 \times 10^6$.

5. A slurry composition for a non-aqueous secondary battery electrode comprising:
an electrode active material; and
the binder composition for a non-aqueous secondary battery electrode according to claim 1.

6. An electrode for a non-aqueous secondary battery produced using the slurry composition for a non-aqueous secondary battery electrode according to claim 5.

7. A non-aqueous secondary battery comprising a positive electrode, a negative electrode, a separator, and an electrolysis solution, wherein
the positive electrode or the negative electrode is the electrode for a non-aqueous secondary battery according to claim 6.

* * * * *